United States Patent Office 2,716,723
Patented Aug. 30, 1955

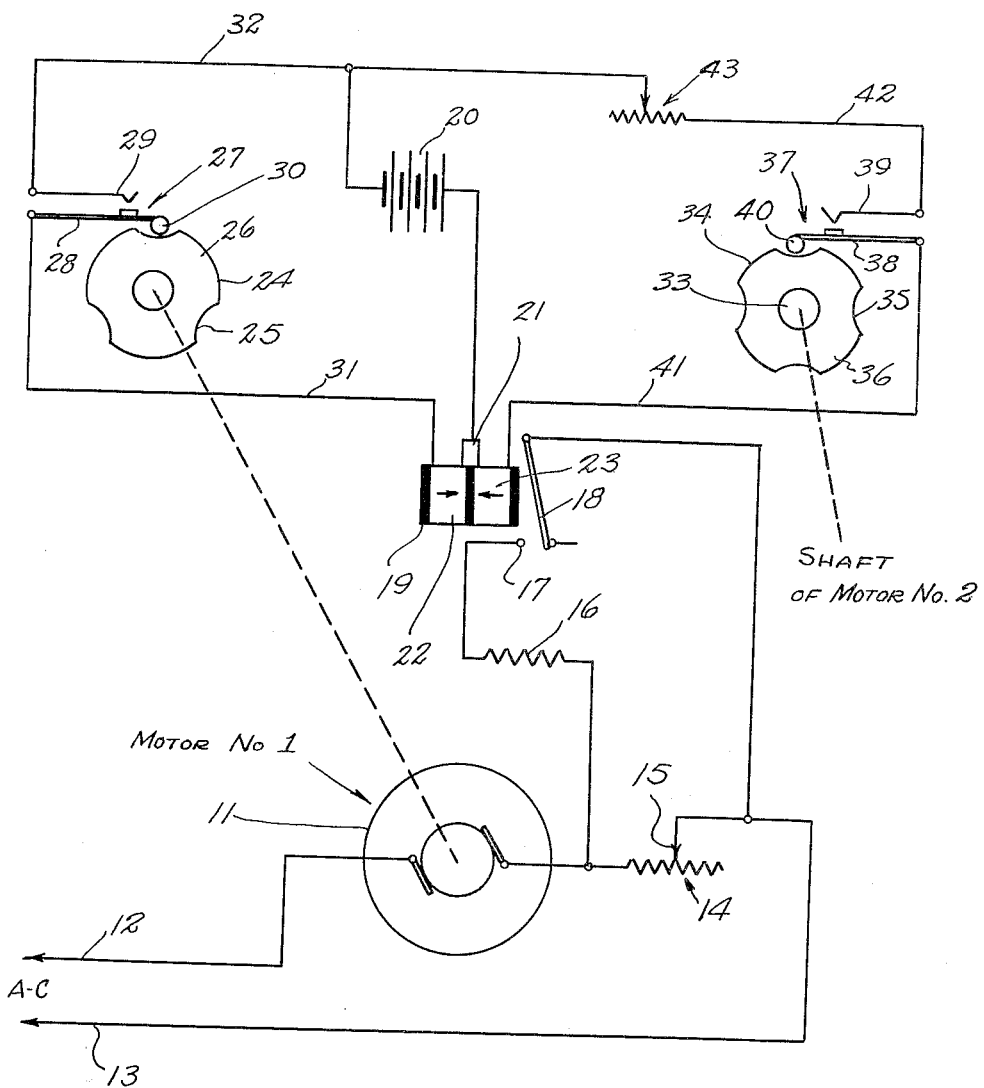

2,716,723

SYNCHRONIZING MEANS FOR ELECTRIC MOTORS

Ivan W. King, St. Joseph, Mo.

Application August 4, 1953, Serial No. 372,317

5 Claims. (Cl. 318—74)

This invention relates to means for synchronizing electric motors, and more particularly to an improved system of synchronizing two electric motors for simultaneous rotation either at the same speed or at a fixed speed relationship.

A main object of the invention is to provide a novel and improved electric motor synchronizing system which is simple in construction, which is reliable in operation, and which involves inexpensive components.

A further object of the invention is to provide an improved means for synchronizing two electric motors so as to maintain a fixed speed relationship between the motors, such as for example, to maintain a fixed speed relationship between the motor of a motion picture projector and the motor of a sound recording machine, to provide synchronization of motion pictures and accompanying sound, the improved system being stable in operation, requiring little or no maintenance, and involving parts which are easy to manufacture and install.

Further objects and advantages of the invention will become apparent from the following description and claims, and from the accompanying drawings, wherein:

The single figure is a schematic wiring diagram illustrating an improved electric motor synchronizing system constructed in accordance with the present invention.

Referring to the drawings, 11 designates a first electric motor, such as the motor of a motion picture projector, said motor being energized by respective line wires 12 and 13, the line wire 13 being provided with a speed-controlling manually adjustable rheostat 14. Since the rheostat 14 is in series with the motor 11, the speed of the motor may be adjusted by regulating the position of the sliding contact of the rheostat 14.

Designated at 16 is a resistor which is connected across the rheostat 14 through the contacts 17 and 18 of a double wound relay 19. As shown, the contact element 18 is movable into engagement with the contact 17 when the relay 19 is energized, whereupon the resistor 16 is connected in shunt with the rheostat 14, thus reducing the series resistance in the circuit of the motor 11, and thus increasing the speed of said motor.

Designated at 20 is a source of current, for example, a battery, having one terminal thereof connected to the common terminal 21 of the respective windings 22 and 23 of the relay 19. The windings 22 and 23 are wound in opposition, and have substantially equal number of turns, whereby the relay will be de-energized when both windings are receiving equal current from the battery 20. However, if there is a displacement of phase between the pulses of current received by the respective windings 22 and 23, whereby one winding receives more current than the other winding at any time, the armature 18 of the relay will be attracted and will engage the contact 17, thus shunting the rheostat 14 with the resistor 16.

Mounted on the shaft of the motor 11 is a first cam 24 which is formed with uniformly spaced notches 25 defining therebetween a plurality of projections 26. Designated at 27 is a switch device comprising a movable arm 28 and a stationary contact 29. The movable arm 28 is pivoted adjacent the cam 24 and is provided at its free end with a follower element 30 which engages the periphery of said cam. Suitable means, not shown, biases the arm 28 into engagement with the periphery of the cam 24. However, rotation of the cam causes the movable contact element 28 to intermittently engage the stationary contact element 29, the rate of closure of the switch 27 being determined by the number of projections 26 and the speed of rotation of the shaft of the motor 11. As shown, the switch device 27 is connected in series with the respective conductors 31 and 32 which connect the outer end terminal of winding 22 to the negative pole of battery 20. Thus, the winding 22 is intermittently energized with pulses of current responsive to the rotation of the shaft of motor 11, said pulses having a frequency equal to the speed of rotation of the shaft of motor 11 multiplied by the number of projections 26 on the cam 24. The shaft of the second electric motor, such as the motor of a sound recording machine to be synchronized with the motion picture motor 11, is designated at 33. Mounted on the shaft of said second motor is a cam 34 formed with uniformly spaced notches 35 on its periphery defining the evenly spaced projections 36. The number of projections 36 is equal to the number of projections 26 on cam 24 multiplied by the desired fixed speed ratio of the shaft of motor 11 to the shaft 33.

Designated at 37 is a switch device similar to the switch device 27, said switch device 37 having the stationary contact arm 39 and the pivoted contact arm 38, the arm 38 being provided with the follower element 40 which engages the periphery of cam 34. The switch device 37 is connected in series between the negative terminal of battery 20 and the outer end terminal of relay winding 23 with respective conductors 41 and 42 and a variable resistance 43, as illustrated. Thus, the respective opposed windings 22 and 23 of the relay 19 receive opposite pulses of current responsive to rotation of the shaft of motor 11 and shaft 33, and since the number of projections on the respective cams 24 and 34 have a ratio inverse to the ratio between the speeds of the shafts of the motors, the frequency of the pulses is equal when said speeds have the desired fixed relationship. The magnitude of the current pulse received by the winding 23 may be equal to the magnitude of the pulse received by the winding 22 by adjustment of the rheostat 43. With the magnitudes of the pulses made equal and with the pulses in phase, the respective windings 22 and 23 of relay 19 are provided with simultaneous pulses of current, and since the windings are in opposition, the pulses of current produce equal and opposite magnetizing forces, whereby the armature 18 is not attracted. However, should the pulses fall out of step, as for example, when the motor 11 slows down or the shaft 33 of the second motor speeds up, the current pulses move out of phase, producing a resultant magnetizing force on the armature 18, causing said armature to be moved into contact with the fixed contact element 17, thus connecting the shunt resistance 16 across rheostat 14. As above explained, this causes the motor 11 to increase its speed, whereby the pulses produced in the relay winding 22 are increased in frequency until they are again in phase with the pulses provided in the relay winding 23, whereby the armature 18 is released, removing the shunt across the rheostat 14 and allowing the motor 11 to slow down.

The rheostat 14 is preferably manually adjusted to a point where the motor 11 is normally slower in speed than that required to provide the desired fixed speed relationship with shaft 33, yet fast enough so that the increase in speed caused by the connection of resistor 16 in shunt with resistor 14 will cause the motor 11 to be increased in speed by an amount more than sufficient to provide the desired fixed speed relationship between the shafts of the two motors. The result will be a constant fluctuation of speed of motor 11 around a mean speed value providing the desired speed relationship between the shafts of the two motors. The value of the resistor 16 is made sufficiently high so that the degree of fluctuation in speed of motor 11 will be relatively small, but at the same time will be sufficient to keep in step with the fluctuations in speed of the shaft 33 of the second motor.

It will be understood that the shaft 33 rotates at a relatively constant speed, the second motor being substantially constant in speed, and the motor 11 being governed in speed by the second motor. The system is therefore arranged to provide compensation for fluctuations in speed of the motor 11 relative to the speed of the second motor.

While a specific embodiment of an improved system for synchronizing the speeds of a pair of electric motors has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. Synchronizing means for a pair of electric motors having respective shafts comprising a first resistance connected in the armature circuit of one motor, a second resistance, circuit means for at times connecting said second resistance in shunt with the first resistance and including a pair of relay contacts, a relay controlling said contacts, a first cam on the shaft of one motor, a second cam on the shaft of the other motor, first and second windings wound in opposition on said relay, said windings having a common terminal, said windings cooperating to control said contacts, a source of current, respective normally open switches, means whereby said cams intermittently close said switches, and respective circuits including said switches connecting said source of current to the respective windings through said common terminal.

2. Synchronizing means for a pair of electric motors having respective shafts comprising a first resistance connected in the armature circuit of one motor, a second resistance, circuit means for at times connecting said second resistance in shunt with the first resistance and including a pair of relay contacts, a relay controlling said contacts, a first cam on the shaft of one motor, a second cam on the shaft of the other motor, first and second windings on said relay, said windings having a common terminal, said windings being arranged in opposition and cooperating to close said contacts when the current pulses in one winding are out of phase relative to the pulses in the other winding, a source of current, respective switches intermittently closed by said cams, and respective circuits including said switches connecting said source of current to the respective windings through said common terminal.

3. Means for stabilizing the speeds of two electric motors at a fixed relationship comprising respective cams mounted on the shafts of the motors, said cams being provided with equally spaced peripheral projections inversely related in number as the desired speeds of the respective motors, respective switches engaging the peripheries of the cams and being closable by said projections responsive to rotation of the cams, a relay having two opposed windings, said windings having a common terminal, a source of current, means connecting the respective windings to said source through the respective switches and through said common terminal, whereby opposed current pulses in phase are applied to the windings when the motor shafts rotate at said fixed speed relationship, a speed changer connected to one of the motors, and switch means controlled by said relay and controllingly connected to said speed changer.

4. Means for stabilizing the speeds of two electric motors at a fixed relationship comprising respective cams mounted on the shafts of the motors, said cams being provided with equally spaced peripheral projections inversely related in number as the desired speeds of the respective motors, respective switches engaging the peripheries of the cams and being closable by said projections responsive to rotation of the cams, a relay having two opposed windings, said windings having a common terminal, a source of current, means connecting the respective windings of said source to the respective switches and through said common terminal whereby opposed current pulses in phase are applied to the windings when the motor shafts rotate at said fixed speed relationship, a manual rheostat in the circuit of one of the motors, and a shunt circuit connected across said rheostat and including switch means controlled by said relay.

5. Means for stabilizing the speeds of two electric motors at a fixed relationship comprising respective cams mounted on the shafts of the motors, said cams being provided with equally spaced peripheral projections inversely related in number as the desired speeds of the respective motors, respective switches engaging the peripheries of the cams and being closable by said projections responsive to rotation of the cams, a relay having two opposed windings, said windings having a common terminal, a source of current, means connecting the respective windings to said source through the respective switches and through said common terminal, whereby opposed current pulses in phase are applied to the windings when the motor shafts rotate at said fixed speed relationship, a manual rheostat in the circuit of one of the motors, a switch controlled by said relay and being closable responsive to energization of said relay resulting from displacement in phase of the current pulses in said opposed windings, a shunt resistance, circuit means connecting said shunt resistance across said rheostat through said last-named switch, and means whereby the speed of said one of the motors will be correctively changed when phase displacement of said current pulses occurs to restore said fixed speed relationship.

References Cited in the file of this patent

UNITED STATES PATENTS

| 636,023 | Cravath | Oct. 31, 1899 |
| 2,406,853 | Richardson et al. | Sept. 3, 1946 |
| 2,425,442 | Schall | Aug. 12, 1947 |
| 2,486,082 | Wagner | Oct. 25, 1949 |

FOREIGN PATENTS

| 332,924 | Great Britain | July 30, 1930 |
| 8,076 | France | July 24, 1904 |

(Addition to No. 377,467)